United States Patent [19]
Toler

[11] Patent Number: 5,948,052
[45] Date of Patent: *Sep. 7, 1999

[54] APPARATUS USING A LOGARITHM BASED PROCESSOR AND AN AUDIO AMPLIFIER

[75] Inventor: Jeffrey G. Toler, Algonquin, Ill.

[73] Assignee: Motorola, Inc., Schaumburg, Ill.

[ * ] Notice: This patent is subject to a terminal disclaimer.

[21] Appl. No.: 08/838,251

[22] Filed: Apr. 17, 1997

[51] Int. Cl.⁶ .............................. G06F 7/00; H40L 25/49

[52] U.S. Cl. ........................................... 708/517; 375/296

[58] Field of Search ............................... 364/715.03, 722, 364/724.011, 748.18, 748.5; 375/296, 297

[56] References Cited

U.S. PATENT DOCUMENTS

| | | | |
|---|---|---|---|
| 3,610,901 | 10/1971 | Lynch | 364/724.011 |
| 4,555,768 | 11/1985 | Lewis, Jr. et al. | 364/757 |
| 4,682,302 | 7/1987 | Williams | 364/768 |
| 4,720,809 | 1/1988 | Taylor | 364/748.18 |
| 5,113,414 | 5/1992 | Karam et al. | 375/296 |
| 5,374,896 | 12/1994 | Sato et al. | 330/149 |
| 5,570,063 | 10/1996 | Eisenberg | 330/149 |
| 5,589,796 | 12/1996 | Alberth, Jr. et al. | 330/133 |

*Primary Examiner*—Ohuong Dinh Ngo
*Attorney, Agent, or Firm*—James E. Gauger

[57] ABSTRACT

An apparatus that includes a logarithm based processor (216) having at least one digital logarithm converter (202) and an audio amplifier (208) responsive to the logarithm based processor (216).

16 Claims, 1 Drawing Sheet

APPARATUS USING A LOGARITHM BASED PROCESSOR AND AN AUDIO AMPLIFIER

CROSS REFERENCES

The present application is related to applications entitled "Apparatus for Amplifying a signal using a Digital Processor", by Pan et al., Ser. No. 08/845,221, now abandoned and "Apparatus Using a Logarithm Based Processor", by Pan et al., Ser. No. 08/838,253, both filed on the same date as the present application. The entire contents, including claims, specification, and drawings, of the above applications are incorporated by reference herein.

FIELD OF THE INVENTION

The present invention generally relates to apparatus that use a logarithm based processor and an audio amplifier.

BACKGROUND OF THE INVENTION

Many existing audio systems and apparatus use conventional digital processing devices to perform a wide variety of functions. For example, microprocessors are used to perform a variety of audio signal processing functions, such as equalization and mixing functions used to prepare music recordings. In addition, digital processors are used in audio play devices such as compact disk players. However, certain audio processing functions have nonlinear characteristics that are not well suited for processing by conventional digital processors. Accordingly, there is a need for an improved processor for use with audio systems.

BRIEF DESCRIPTION OF THE DRAWINGS

The invention is pointed out with particularity in the appended claims. However, other features of the invention may become more apparent and the invention may be better understood by referring to the following detailed description in conjunction with the accompanying drawings.

BRIEF DESCRIPTION OF THE DRAWINGS

Figure 1:
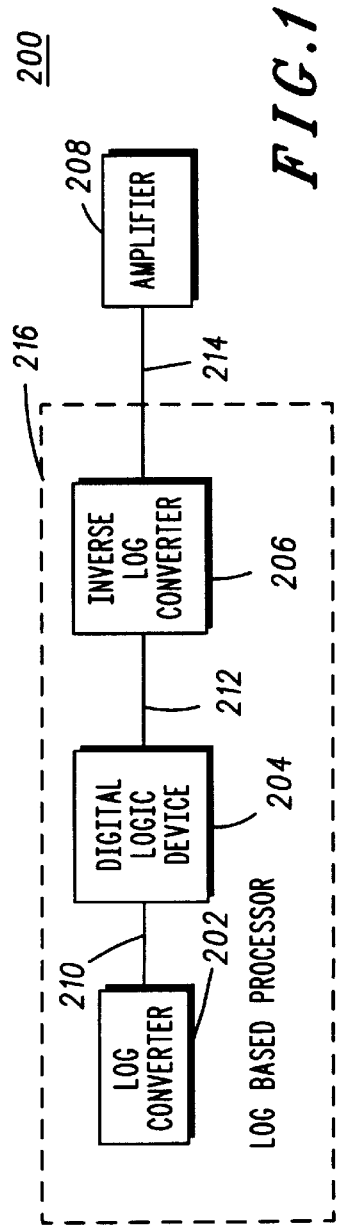

FIG. 1 is a block diagram of an embodiment of an apparatus that may be used in conjunction with an audio apparatus in accordance with the present invention.

Figure 2:
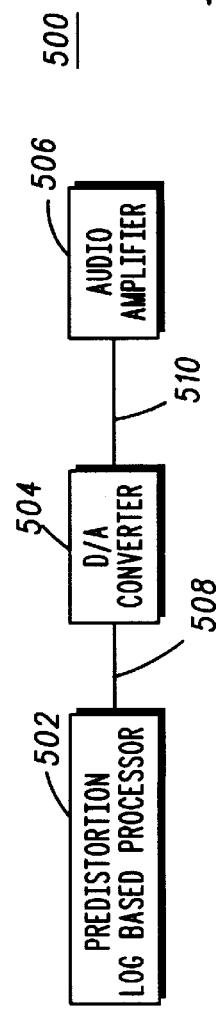

FIG. 2 is a block diagram of an embodiment of an audio amplifier system in accordance with the present invention.

Figure 3:
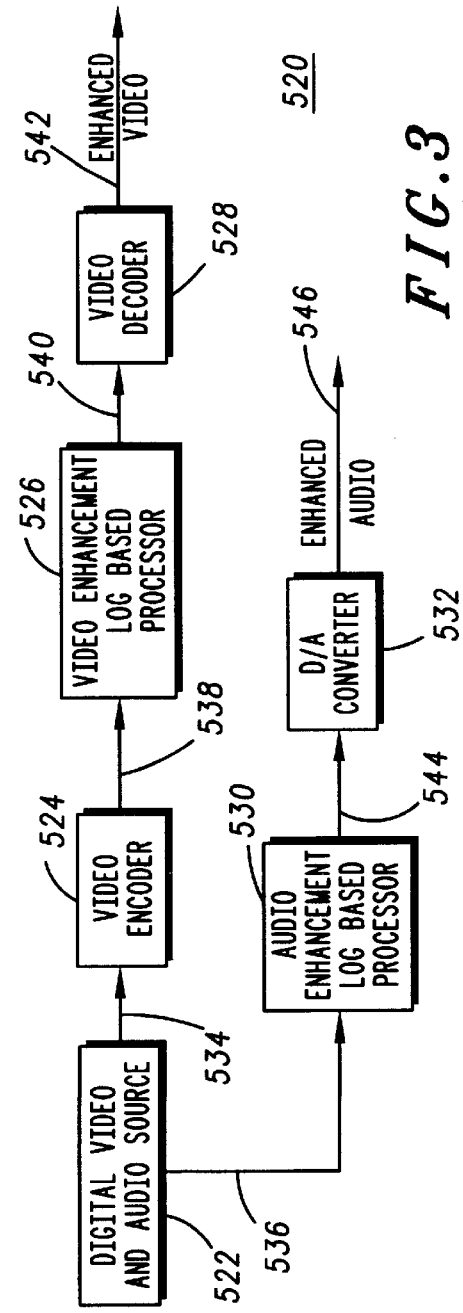

FIG. 3 is a block diagram of an embodiment of a video and audio processing system in accordance with the present invention.

DETAILED DESCRIPTION OF THE PREFERRED EMBODIMENT(S)

In order to address the above described need, the present invention provides audio systems and apparatus that use a logarithm based processor. Due to the increased processing speed and other advantages of the logarithm based processor, apparatus using a logarithm based processor can provide greater performance in a wide variety of applications.

In accordance with an embodiment of the present invention, the apparatus includes a logarithm based processor having at least one digital logarithm converter and an audio amplifier responsive to the logarithm based processor. In accordance with another embodiment of the present invention, a method of using an apparatus is disclosed. The method includes the steps of providing a logarithm based processor having at least one digital logarithm converter; providing an audio amplifier responsive to the logarithm based processor; digitally predistorting an audio signal; and applying the predistorted audio signal to an input of the audio amplifier.

Referring to FIG. 1, an embodiment of an apparatus 200 is illustrated. The apparatus 200 includes a logarithm based processor 216 and an amplifier 208. The logarithm based processor 216 is connected to the amplifier 208 by a communication link 214. In the preferred embodiment, the communication link 214 may be either a single electrically conductive connection, such as a copper wire, or may be a plurality of different electrically conductive connections. The logarithm based processor 216 includes a logarithm converter 202, a digital logic device 204, and an inverse logarithm converter 206. The digital logic device 204 is coupled to the logarithm converter 202 via a first digital connection 210 and is coupled to the inverse logarithm converter 206 via a second digital connection 212. The digital logic device 204 may be any known digital logic device, such as a register, a shifting device, a summer, a multiplexor, an and gate, an or gate, an exclusive or gate, an exclusive and gate, an inverter, a flip flop, a counter, arithmetic logic units, or any other digital circuit. The logarithm converter 202 and the inverse logarithm converter 206 may be any logarithm converter and inverse logarithm converter having good computation accuracy and high speed. An example of such devices may be found in pending application Ser. No. 08/382,467, filed Jan. 31, 1995. Further details regarding a particular implementation of the logarithm based processor 216 are disclosed in copending application "Apparatus for Amplifying a signal using a Digital Processor", by Pan et al., attorney docket number MNE00464N.

The apparatus 200 may be beneficially used in a large number of applications by appropriately programming the logarithm based processor 216 to control the amplifier 208. For example, the logarithm based processor 216 may be programmed to provide a predistortion signal over communication link 214 to the amplifier 208. Since the logarithm based processor 216 is a high speed digital processor suitable for computing polynomial equations, the predistortion signal may be determined quickly enough to efficiently control the amplifier 208. In the preferred embodiment, the predistortion signal is approximated using a polynomial function, such as a nonlinear polynomial function of the form $aX^i+bX+c$, where a, b, c are coefficients, X is an input variable, such as current or voltage, and i is an exponential. The logarithm based processor 216 calculates certain terms in a polynomial equation, such as the term $X^i$, very quickly since a combination of low complexity high speed shifting and adding operations performed by the digital logic device 204 may be used instead of complex low speed floating point multiplications. Although only a single exponential term and a single variable, X, was used for illustrated purposed, it is contemplated that the logarithm based processor 216 calculated polynomials with a plurality of exponential terms and a plurality of variables. An example of a particular predistortion configuration using a log based processor is disclosed in copending application "Apparatus for Amplifying a signal using a Digital Processor", by Pan et al., attorney docket number MNE00464N.

Referring to FIG. 2, an embodiment of an audio enhancement system 500 is illustrated. The audio enhancement system 500 includes a logarithm based processor 502, a digital to analog converter 504, and an audio amplifier 506. The logarithm based processor 502 is configured to perform predistortion. The logarithm based processor 502 receives an input audio signal and produces a predistorted audio signal 508, which is converted to a predistorted analog signal 510 which drives audio amplifier 506. By predistorting the analog signal 510, an output signal from the amplifier 506 will have reduced distortion providing greater linearity and hence improved audio quality. Alternatively, by providing greater linearity, a lower power amplifier using predistortion can provide similar quality audio as a non-predistorted audio amplifier with higher power. In this manner, power may be conserved.

Referring to FIG. 3, a video and audio enhancement system 520 is illustrated. The system 520 includes a digital video and audio source 522, a video encoder 524, a video enhancement module 526, a video decoder 528, an audio enhancement logarithm based processor 530, and a digital to analog converter 532. The digital video and audio source produces a video signal 534 and an audio signal 536. The video encoder encodes the video signal 534 to produce encoded signal 538. Video enhancement processor 526 processes the encoded signal 538 to improve video quality, such as by interpolating pixels, to produce enhanced video signal 540. Video enhancement processor 526 may be a conventional processor that performs pixel interpolation or may optionally include a logarithm based processing element.

Decoder 528 receives enhanced video signal 540 and produces a decoded enhanced video signal 542, which may be applied to a display such as a television monitor. Audio enhancement processor 530, which is preferably a logarithm based processor, digitally processes the audio signal 536 to enhance the quality of the audio signal, such as by applying predistortion, to produce processed audio signal 544. Digital to analog converter 532 receives the processed audio signal 544 to produce an analog signal 546 which is fed to an audio amplifier and finally applied to a speaker (not shown). An example of a suitable application for the above video and audio enhancement system 520 is a video projection type system, such as a home theater, where improved video and audio quality is desired. However, the disclosed embodiment may be used in any application where enhanced video and audio signals are desired.

Thus, there has been disclosed an apparatus, system, and a method for amplifying audio signals that uses a logarithm based processor. The resulting apparatus provides amplification of audio signals over an extended linear range with reduced distortion, resulting in lower cost amplification and improved audio signal response. In addition, the logarithm based processor provides increased processing speed and improved processing performance for audio signal processing.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. An audio signal processing system comprising:
    a logarithm based processor having at least one inverse logarithm converter, the logarithm based processor configured to digitally predistort an audio signal by processing a nonlinear polynomial function having a plurality of terms, at least one of the plurality of terms represented by a coefficient and an exponential term, to produce a predistorted audio signal;
    a digital to analog converter coupled to the logarithm based processor, the digital to analog converter receiving the predistorted audio signal and producing an analog version of the predistorted audio signal; and
    an audio amplifier coupled to the digital to analog converter, the audio amplifier receiving and amplifying the analog version of the predistorted audio signal to produce an amplified audio output signal.

2. The apparatus of claim 1, wherein the logarithm based processor further comprises a logarithm converter.

3. The apparatus of claim 1, wherein the logarithm based processor further comprises a digital logic circuit.

4. The apparatus of claim 3, wherein the amplified audio output signal is an audio signal having enhanced audio quality due to application of the nonlinear polynomial function to the audio amplifier.

5. The apparatus of claim 4, wherein the nonlinear polynomial function has the form $aX^i+bX+c$, where a, b, c are coefficients, X is an input signal and i is an exponential.

6. A video and audio signal processing system comprising:
    a video processor having an input to receive a video signal;
    a video decoder coupled to the video processor, the video decoder having an input to receive a processed video signal from the video processor and producing a decoded video signal; and
    an audio signal processing system comprising:
        a logarithm based processor configured to digitally predistort an audio signal by processing a nonlinear polynomial function having a plurality of terms, at least one of the plurality of terms represented by a coefficient and an exponential term, to produce a predistorted audio signal;
        a digital to analog converter coupled to the logarithm based processor, the digital to analog converter receiving the predistorted audio signal and producing an analog version of the predistorted audio signal; and
        an audio amplifier coupled to the digital to analog converter, the audio amplifier receiving and amplifying the analog version of the predistorted audio signal to produce an amplified audio output signal.

7. The system of claim 6, wherein the logarithm based processor includes an inverse logarithm converter.

8. The system of claim 6, further comprising a video and audio source, the video and audio source producing the video signal and the audio signal respectively.

9. The system of claim 6, wherein the nonlinear polynomial function is an approximation of an ideal predistortion signal that would cancel signal distortion due to amplification by the audio amplifier.

10. The system of claim 9, wherein the video processor includes a second logarithm based processor.

11. A method of processing an audio signal, the method comprising the steps of:
    providing a logarithm based processor having at least one digital logarithm converter;
    providing an audio amplifier responsive to the logarithm based processor;
    digitally predistorting the audio signal to produce a predistorted audio signal by using the logarithm based processor to apply a nonlinear polynomial function that approximates an ideal predistortion signal to cancel signal distortion due to amplification by the audio amplifier; and applying the predistorted audio signal to an input of the audio amplifier.

12. The method of claim 11, wherein the logarithm based processor further comprises an anti-logarithm converter.

13. The method of claim 11, wherein the logarithm based processor further comprises a digital logarithm converter and a digital logic circuit responsive to the digital logarithm converter.

14. The method of claim 11, wherein the nonlinear polynomial function has the form $aX^i+bX+c$, where a, b, c are coefficients, X is an input signal, and i is an exponential.

15. The method of claim 11, further comprising amplifying the predistorted audio signal to produce an amplified output signal.

16. The method of claim 15, further comprising applying the amplified output signal from the audio amplifier to a speaker, the output signal having enhanced audio quality due to application of the nonlinear polynomial function to the input of the audio amplifier.

* * * * *